US005695406A

United States Patent [19]
Park

[11] Patent Number: 5,695,406
[45] Date of Patent: Dec. 9, 1997

[54] IMMERSIVE CYBERSPACE SYSTEM

[76] Inventor: Brian V. Park, 16701 Westview Trail, Austin, Tex. 78737

[21] Appl. No.: 601,616

[22] Filed: Feb. 14, 1996

Related U.S. Application Data

[63] Continuation-in-part of Ser. No. 238,166, May 4, 1994, abandoned.

[51] Int. Cl.$^6$ .................................................. A63G 31/16
[52] U.S. Cl. ........................... 472/61; 472/130; 434/55
[58] Field of Search ........................... 472/59, 60, 61, 472/130; 2/906, 6.2, 6.3; 345/8, 156, 163; 434/29, 55

[56] References Cited

U.S. PATENT DOCUMENTS

| D. 169,299 | 4/1953 | Willemin . |
| D. 182,813 | 5/1958 | Golden et al. . |
| D. 183,790 | 10/1958 | Deaton . |

(List continued on next page.)

FOREIGN PATENT DOCUMENTS

| 71376 | 7/1965 | Canada . |
| 672824 | 1/1930 | France . |
| 2568458 | 2/1986 | France . |
| 436606 | 11/1967 | Switzerland . |

OTHER PUBLICATIONS

Flogiston, "The Flogiston Chair, an Environment for Computer Aided Humans," Flogiston Times No. 10, 1989, pp. 2–14.

Fisher, S.S. et al., "Virtual Environment Display System," Chapel Hill, North Carolina, Oct. 1986, pp.1–11.

International Search Report for PCT/US96/20575 dated Apr. 16, 1997.

Holt, Rinehart and Winston, "Integral Yoga Hatha," pp. 84 and 85.

Flogiston, "The Flogiston Chair, an Environment for Computer Aided Humans," Flogiston Times No. 7, pp. 2–14 and glossary.

Flogiston, "The Flogiston Chair, an Environment for Computer Aided Humans," Flogiston Times No. 10, pp. 2–12.

Brand Norman Griffin, "The Influence of Zero–G and Acceleration on the Human Factors of Spacecraft Design," Aug. 1978, pp. 1–52.

Fischer et al., "Virtual Environment Display System", Oct. 23, 1986, pp. 2–4.

*Primary Examiner*—Kien T. Nguyen
*Attorney, Agent, or Firm*—Conley, Rose & Tayon; Jeffrey C. Hood

[57] ABSTRACT

An immersive cyberspace system is presented which provides visual, audible, and vibrational inputs to a subject remaining in neutral immersion, and also provides for subject control input. The immersive cyberspace system includes a relaxation chair and a neutral immersion display hood. The relaxation chair supports a subject positioned thereupon, and places the subject in position which merges a neutral body position, the position a body naturally assumes in zero gravity, with a savasana yoga position. The display hood, which covers the subject's head, is configured to produce light images and sounds. An image projection subsystem provides either external or internal image projection. The display hood includes a projection screen moveably attached to an opaque shroud. A motion base supports the relaxation chair and produces vibrational inputs over a range of about 0–30 Hz. The motion base also produces limited translation and rotational movements of the relaxation chair. These limited translational and rotational movements, when properly coordinated with visual stimuli, constitute motion cues which create sensations of pitch, yaw, and roll movements. Vibration transducers produce vibrational inputs from about 20 Hz to about 150 Hz. An external computer, coupled to various components of the immersive cyberspace system, executes a software program and creates the cyberspace environment. One or more neutral hand posture controllers may be coupled to the external computer system and used to control various aspects of the cyberspace environment, or to enter data during the cyberspace experience.

60 Claims, 14 Drawing Sheets

U.S. PATENT DOCUMENTS

| | | |
|---|---|---|
| D. 192,855 | 5/1962 | Mengel . |
| D. 194,497 | 2/1963 | Miller . |
| D. 194,498 | 2/1963 | Miller . |
| D. 197,513 | 2/1964 | Crawford . |
| D. 210,940 | 5/1968 | Venice . |
| D. 244,811 | 6/1977 | Sternfield . |
| D. 288,993 | 3/1987 | Grimsrud . |
| D. 292,247 | 10/1987 | Grimsrud . |
| 2,215,540 | 9/1940 | Breuer . |
| 2,439,322 | 4/1948 | Thaden . |
| 2,670,787 | 3/1954 | Vandas et al. . |
| 2,696,869 | 12/1954 | Schlaak . |
| 2,847,061 | 8/1958 | Morton . |
| 3,038,175 | 6/1962 | Faget et al. . |
| 3,115,366 | 12/1963 | Glass . |
| 3,447,170 | 6/1969 | Spitz . |
| 3,711,878 | 1/1973 | George et al. . |
| 3,729,227 | 4/1973 | Ohta . |
| 3,762,767 | 10/1973 | Powell . |
| 3,854,131 | 12/1974 | Vanderheiden et al. ............ 345/163 X |
| 3,865,430 | 2/1975 | Tanus . |
| 4,064,376 | 12/1977 | Yamada . |
| 4,124,249 | 11/1978 | Abbeloos . |
| 4,230,365 | 10/1980 | Messinger . |
| 4,277,103 | 7/1981 | Weik . |
| 4,527,980 | 7/1985 | Miller . |
| 4,594,817 | 6/1986 | McLaren et al. . |
| 4,605,261 | 8/1986 | Lee . |
| 4,798,376 | 1/1989 | Trumbull et al. . |
| 4,856,771 | 8/1989 | Nelson et al. . |
| 4,862,165 | 8/1989 | Gart . |
| 4,995,603 | 2/1991 | Reed . |
| 5,141,285 | 8/1992 | Park . |
| 5,322,441 | 6/1994 | Lewis et al. ............................ 345/8 X |
| 5,490,784 | 2/1996 | Carmein ................................. 434/29 X |

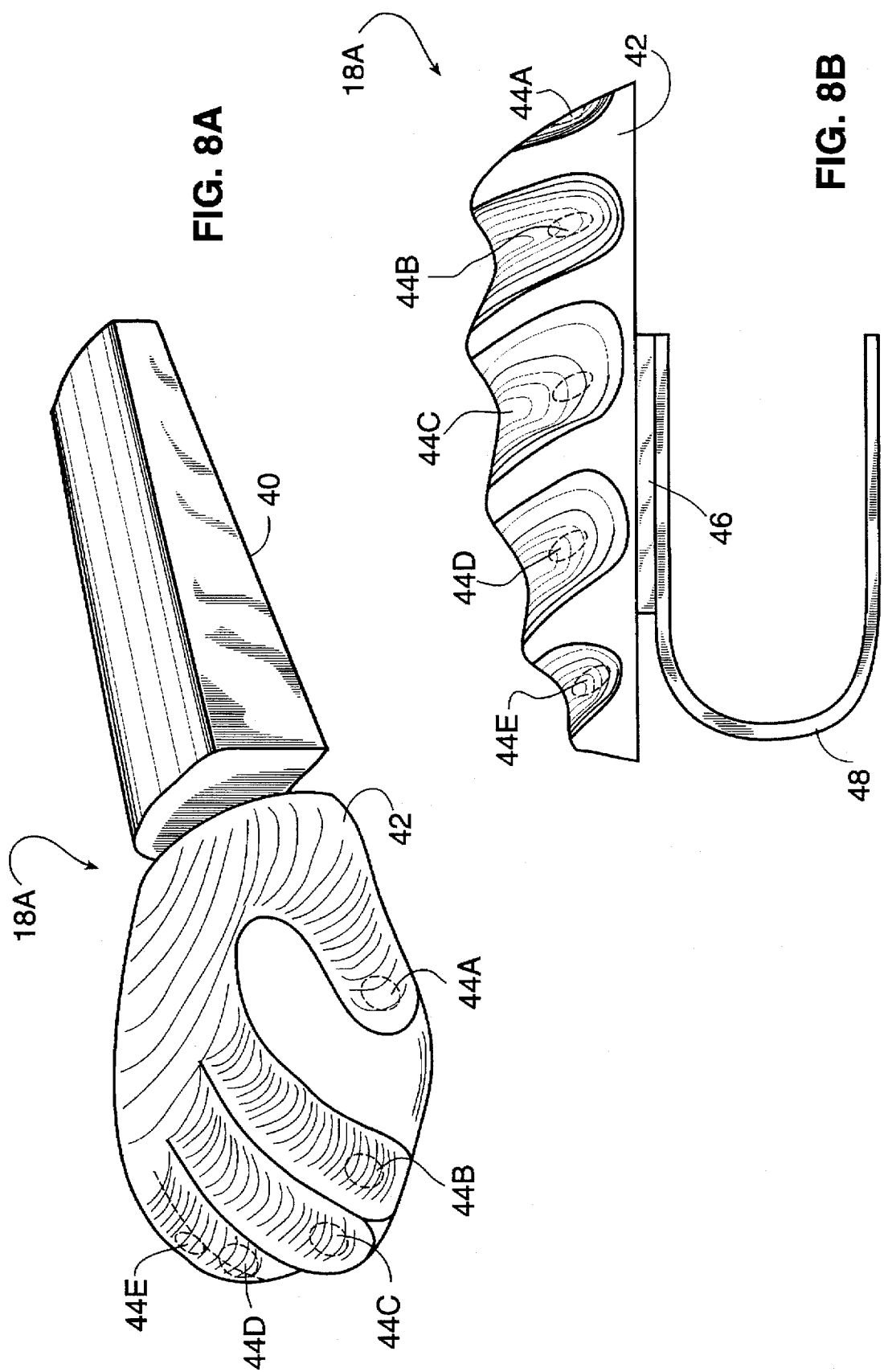

IMMERSIVE CYBERSPACE SYSTEM

CONTINUATION DATA

This patent application is a continuation-in-part to application Ser. No. 08/238,166, titled "Immersive Cyberspace System," filed May 4, 1994 now abandoned.

GOVERNMENT LICENSE RIGHTS

The U.S. Government has a paid-up license in this invention and the right in limited circumstances to require the patent owner to license others on reasonable terms as provided for by the terms of contract No. NAS 9-193 16 awarded by NASA.

FIELD OF THE INVENTION

The present invention relates to a system for immersion in a computer-generated cyberspace environment.

DESCRIPTION OF THE RELATED ART

The term "realspace" is used herein to refer to the "real world" in which we live. The term "mindspace" refers to the world of the human mind. The term "cyberspace" generally refers to an interactive electronic world in which stimuli created by a computer system are applied to a subject, and the subject may also provide inputs to the computer system. Cyberspace is a boundless three-dimensional extent in which objects and events occur and have relative position and direction (i.e., a space). In the evolution of space, cyberspace is created from and concurrently exists with the two other spaces, realspace and mindspace. Cyberspace may also be said to be a child of realspace and mindspace.

The closest prior art to an immersive cyberspace system exists in flight simulation, virtual reality devices, spherical projection systems, planetariums, limited immersion video games and rehabilitation therapy. Flight simulators have been in existence for nearly forty years, being used by NASA, commercial airlines, and flight training schools. During this period of time, many different devices have been used to enhance the realism of the simulated experience. None, however, have introduced the element of neutral immersion concepts to reduce stress and awareness of real space stimuli and thereby strengthen the experience.

Virtual reality technology has also been around for a growing period of time and attempts to create immersion therein. Constant reminders, however, of the outside world reduce effectiveness of the experience. One of the most vexing causes of outside interference with the virtual reality technology of the past is that the user is always quite aware of forces acting upon the body. In addition, the user experiences discomfort from wearing head mounted displays, and is constrained by the lengths of cable between various pieces of equipment attached to the body. This condition is caused by an abundance of realspace distractions. The invention hereunder described solves this problem by eliminating as many of these distractions as possible.

Video games are sometimes placed within a shell of the thing which relates thereto. For example, motorcycle games sometimes provide a full size replica of a motorcycle to sit on and lean off of, car racing games sometimes provide automobile shells from which one can indulge himself while playing the game. Other examples exist but are cumulative and unnecessary here. These are a step towards immersion but still exist in real space. These games do not supply the relaxed position of the relaxation chair, combined with neutral display and neutral hand controllers, or the total immersion of computer controlled environmental effects.

Rehabilitation therapy also provides certain types of immersion. For example, Applicant is aware that John C. Lilly, M.D., developed epsom salt tanks to relax patients by rendering them weightless. The simulation of weightlessness creates relaxation which is helpful for rehabilitation. Technology, however, has not, until now, provided a system and method for total immersion in cyberspace. Therefore, an improved immersive cyberspace system is desired which provides a more realistic cyberspace environment.

SUMMARY OF THE INVENTION

The immersive cyberspace system of the present invention comprises four basic elements which work together as part of an integrated unit: (1) a relaxation chair adapted to receive a human subject, (2) a motion base, (3) a neutral immersion display hood attached to the relaxation chair with image and sound production capabilities, and (4) one or more neutral hand posture controllers. The immersive cyberspace system provides visual, audible, motion cueing, and vibrational input to a subject remaining in a neutral position, and also provides for subject control input. The immersive cyberspace system of the present invention uses the concept of neutral immersion to provide a more complete and immersive cyberspace environment. Other sensory stimuli, such as smell and touch, may also be produced by the system and provided to the subject.

The relaxation chair supports a subject positioned thereupon. The relaxation chair places the subject in a position which merges a neutral body position, the position a body naturally assumes in zero gravity, with the savasana yoga position, the position used by yogi for thousands of years to reach an enhanced meditative relaxation state. The relaxed position minimizes external forces acting upon the body, allowing the subject a reduced awareness of realspace stimuli and the ability to become more immersed in the cyberspace environment. The neutral immersion display hood substantially covers the subject's head during use and is configured to produce light images and sounds. An image projection subsystem provides either external or internal image projection. The neutral immersion display hood includes a projection screen moveably attached to an opaque shroud. A motion base supports the relaxation chair and produces vibrational inputs over a range of about 0–30 Hz. The motion base also produces limited translational and rotational movements of the relaxation chair. These limited translational and rotational movements, when properly coordinated with visual stimuli, constitute motion cues which create sensations of pitch, yaw, and roll movements. Vibration transducers attached to the relaxation chair produce vibrational inputs from about 20 Hz to about 150 Hz. One or more neutral hand posture controllers may be used to control various aspects of the cyberspace environment, or to enter data during the cyberspace experience. An external computer is coupled to one or more of the various components of the immersive cyberspace system, including the motion base, the image projection subsystem, the vibration transducers, audio speakers located within the display hood, and the neutral hand posture controllers.

The neutral immersion display hood includes an opaque shroud configured to cover a top portion, side portions, and a back portion of the subject's head. The projection screen is configured to substantially cover a front portion of the subject's head during use so that the projection screen provides visual stimuli in a 120° vertical by 180° horizontal field of view while maintaining a neutral eye posture. The neutral eye posture is achieved when internal forces acting on the muscles of the eyes are minimized, and a biomechanical equilibrium is reached. The 120° vertical by 180° horizontal field ensures that a subject's peripheral vision is fully engaged in a look-ahead mode. When an external image projection subsystem is used, a projector is located in front of, below, or behind a subject positioned on the relaxation chair. The projector produces a light image which is either projected directly onto an exterior surface of the projection screen, or is reflected off of an adjustable mirror before striking the exterior surface of the projection screen. For external image projection, the projection screen is preferably made of a clear, lightweight material, and the interior and exterior surfaces of the projection screen are prepared such that the light image striking the exterior surface of the projection screen is visible on the interior surface. A headrest located within the shroud supports the subject's head. The shroud also includes one or more speakers which produce sounds over a frequency range of about 20 Hz to about 20 kHz in response to signals produced by the computer system.

The neutral immersion display hood may include an internal image projection subsystem. In this case, the shroud includes one or more small projectors mounted within the shroud. For internal image projection, the projection screen is preferably made of an opaque material, and the interior surface is preferably coated with a reflective material such that a light image projected onto the interior surface is visible on the interior surface. The projectors produce light images which are directed toward the interior surface of the projection screen. Two projectors are preferably employed, located on opposite sides of the shroud. The light images of the projectors are made to overlap in a central region of the interior surface of the projection screen. Various well known techniques may be used to produce the light images such that a subject viewing the interior surface of the projection screen perceives a three-dimensional image in the region where the two light images overlap. Suitable projectors for the internal image projection subsystem include raster laser projectors capable of producing images which appear in focus over the broad range of focal distances involved.

The immersive cyberspace system may also include one or more neutral hand posture controllers. Each neutral hand posture controller includes a wrist support to support a subject's wrist, a palm piece to support a subject's hand in the hand neutral posture, and at least one pressure-sensitive electrical switch which is activated by movement of the hand. The palm piece is coupled to a base such that the hand is retained in a neutral position defined by an axial rotation of the hand about the subject's attached arm of about 30 degrees. In the neutral hand position, internal and external forces acting on the hand are minimized, and a biomechanical equilibrium is reached. The coupling mechanism between the palm piece and the base allows the subject's supported hand to move about 0.25 to 3.0 inches in all directions relative to the base, thus providing six degrees of freedom (i.e. side-to-side movement, forward and back movement, and up and down movement). The coupling mechanism may also include an electrical switch activated by downward pressure applied to the palm piece. Alternately, the coupling mechanism may include an electrical signal generator which produces a variable output voltage with a value dependent upon the downward pressure applied to the palm piece. A pressure-sensitive electrical switch may be provided for the thumb and for each finger. The electrical signals generated by the switches and/or signal generator may be coupled to the computer system and used to control various aspects of the cyberspace environment, or may be used to enter data during the cyberspace experience.

Therefore, the present invention provides an immersive cyberspace system which includes various neutral posture elements to provide a more complete immersive cyberspace environment.

BRIEF DESCRIPTION OF THE DRAWINGS

A better understanding of the present invention can be obtained when the following detailed description of the preferred embodiment is considered in conjunction with the following drawings, in which:

FIG. 3b is a front elevation view of the movable projection screen of FIG. 3a;

FIG. 3c is a side elevation view of the movable projection screen of FIG. 3a;

FIG. 4b is a front elevation view of the movable projection screen of FIG. 4a;

FIG. 4c is a side elevation view of the movable projection screen of FIG. 4a;

FIG. 5b is a from elevation view of the movable projection screen of FIG. 5a;

FIG. 5c is a side elevation view of the movable projection screen of FIG. 5a;

FIG. 8a is a perspective view of a neutral hand posture controller; and

FIG. 8b is a front elevation view of a neutral hand posture controller.

DETAILED DESCRIPTION OF THE PREFERRED EMBODIMENT

Figure 1A:
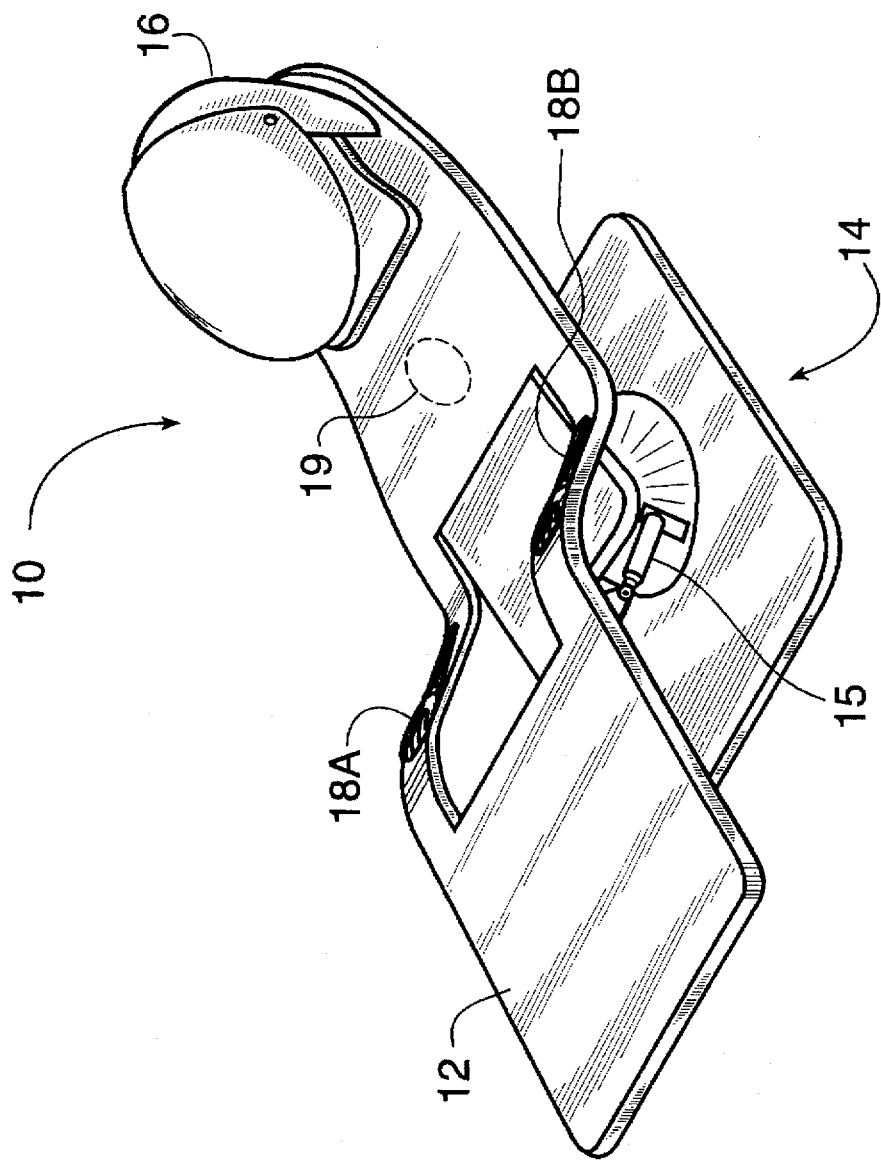
FIG. 1a is a perspective view of one embodiment of an immersive cyberspace system including a relaxation chair, a motion base, a neutral immersion display hood, and two neutral hand posture controllers.
Figure 1B:
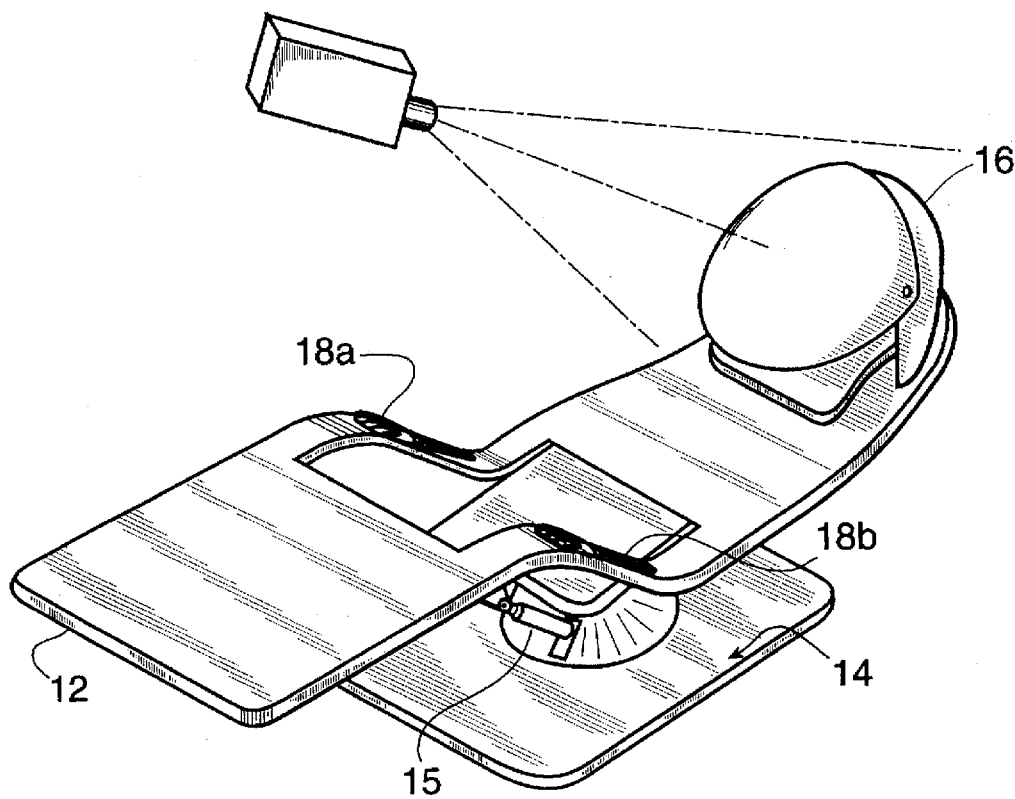
FIG. 1b is a perspective view of a second embodiment of the immersive cyberspace system.
Figure 1C:
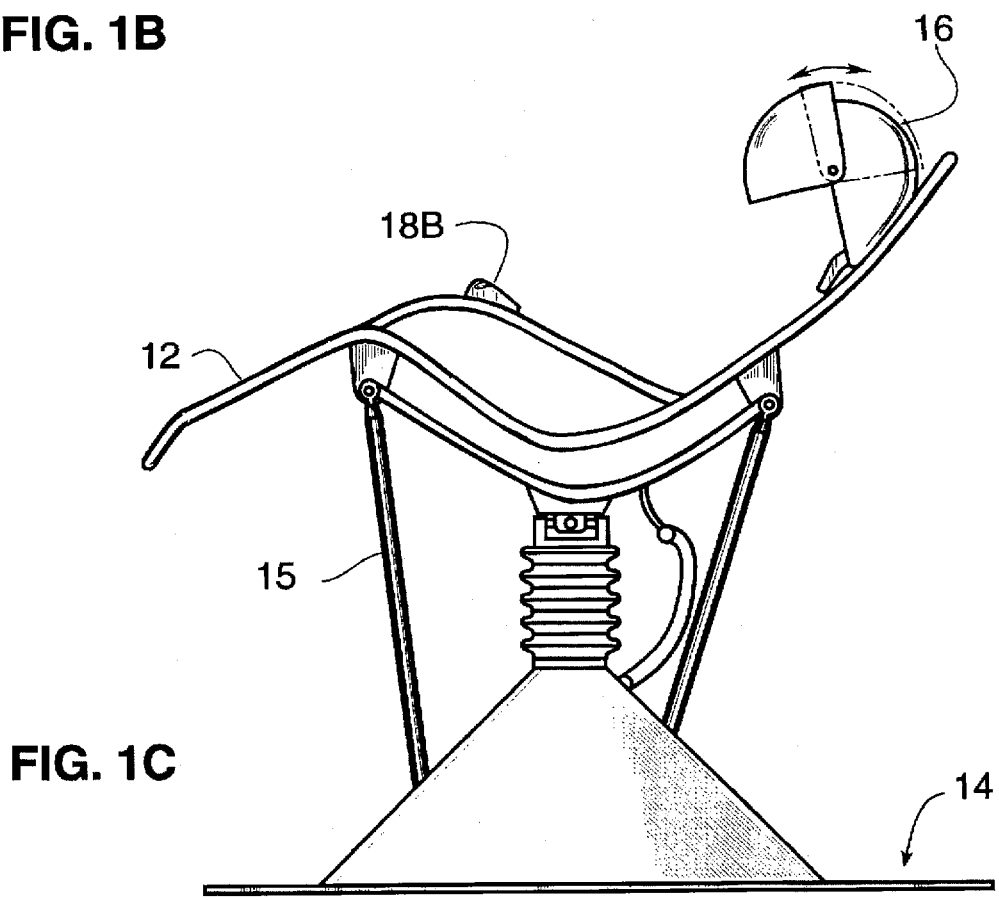
FIG. 1c is a side elevation view of the second embodiment of the immersive cyberspace system.

Referring to FIG. 1a, one embodiment of an immersive cyberspace system 10 is shown including a relaxation chair 12, a motion base 14, a neutral immersion display hood 16, two neutral hand posture controllers 18a (right hand) and 18b (left hand), and one or more vibration transducers 19. Relaxation chair 12 places a subject positioned thereupon in a relaxed position which minimizes external forces acting upon the body. The relaxed position allows the subject a reduced awareness of realspace stimuli and the ability to become more immersed in the cyberspace environment. Motion base 14 supports the relaxation chair and produces vibrational inputs over a range of about 0–30 Hz. Motion base 14 provides motion cues, as well as physical inputs to simulate pitch, yaw, and roll movements. Neutral immersion display hood 16 is located at the "head end" of the chair and may be attached to relaxation chair 12. Neutral immersion display hood 16 substantially covers the subject's head during use, and is configured to produce light images and sounds. Neutral immersion display hood 16 includes a projection screen which covers the subject's face during use. An image projection subsystem provides either external or internal image projection onto the projection screen of the display hood 16. The neutral hand posture controllers 18 may be used to control various aspects of the cyberspace environment, or to enter data during the cyberspace experience. Neutral hand posture controllers 18 may be used for navigation and to manipulate objects in three-dimensional space, to emulate two-dimensional movements of common input devices (i.e., mice), or to emulate typewriter or music keyboards. Vibration transducers 19 are attached to the relaxation chair and produce vibrational inputs from about 20 Hz to about 150 Hz. FIGS. 1b and 1c illustrate a second embodiment of the immersive cyberspace system in which the neutral immersion display hood comprises an upper portion of relaxation chair 12.

The immersive cyberspace system 10 comprises an integrated system which incorporates the above elements, i.e., which incorporates a relaxation chair 12, a motion base 14, a neutral immersion display hood 16, one or more neutral hand posture controllers 18a and/or 18b, and one or more vibration transducers 19. The various elements comprising the system 10 are thus designed to operate together to provide an immersive cyberspace system or environment. It is noted that an embodiment of the immersive cyberspace system 10 may include only a subset, i.e., less than all, of the above elements, as desired. However, such an embodiment may provide a less immersive cyberspace environment.

Neutral immersion is a process which consciously reduces awareness of realspace stimuli and reduces exchanges between realspace and mindspace. Neutral immersion also increases attention to exchanges between cyberspace and mindspace. Neutral immersion may be maintained over an extended period of time without fatigue.

Relaxation Chair

Relaxation chair 12 is preferably similar to the relaxation chair described in U.S. Pat. No. 5,141,285 to Park, which is incorporated herein by reference in its entirety. The relaxation chair supports a subject positioned thereupon, and places the subject in position which merges a neutral body position, the position a body naturally assumes in zero gravity, with the savasana yoga position, the position used by yogi for thousands of years to reach an enhanced meditative relaxation state. In profile, the user's body assumes the angles found in the profile of the neutral body position. In the ventral view, the user's body has the same angles as in the savasana yoga position. A subject positioned upon relaxation chair 12 experiences a substantial reduction in external forces acting upon the body, allowing the subject a reduced awareness of realspace stimuli and the ability to become more immersed in the cyberspace environment.

Neutral Immersion Display Hood

Figure 2:
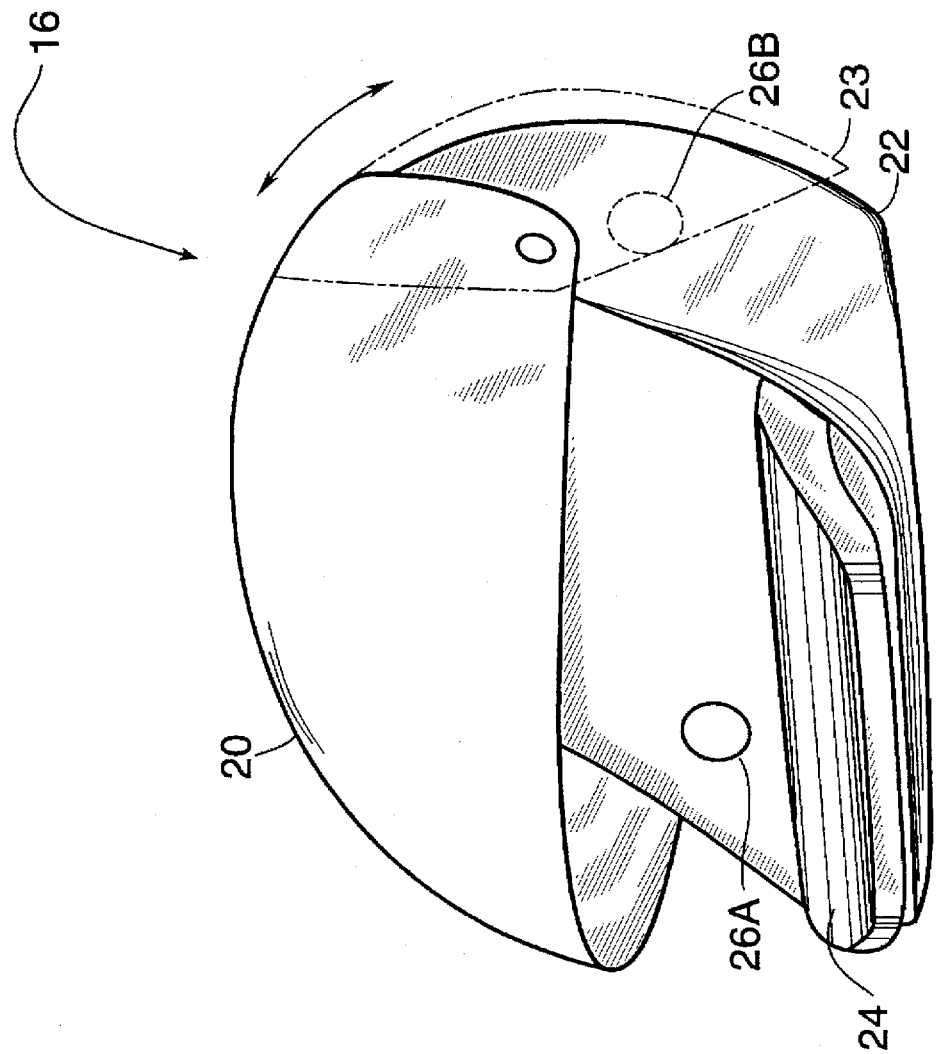
FIG. 2 is a perspective view of the neutral immersion display hood according to one embodiment of the present invention.

FIG. 2 is a perspective view of the neutral immersion display hood 16 according to one embodiment of the present invention. FIGS. 1b and 1c illustrate a second embodiment of the immersive cyberspace system in which neutral immersion display hood 16 comprises an upper portion of relaxation chair 12. In the embodiment of FIG. 2, neutral immersion display hood 16 is attached to relaxation chair 12, and may be adjusted according to a subject's height. Neutral immersion display hood 16 includes an opaque shroud 22 and a projection screen 20 moveably attached to shroud 22. Shroud 22 is configured to cover a top portion, side portions, and a back portion of the head of the subject positioned on relaxation chair 12. Projection screen 20 may be moved between a non-use and a use position. Projection screen 20 is configured to substantially cover a front portion of the head of the subject during use, and provides visual stimuli in a 120° vertical by 180° horizontal field of view while maintaining a neutral eye posture. The neutral eye posture is achieved when internal forces acting on the muscles of the eyes are minimized, and a biomechanical equilibrium is reached. The 120° vertical by 180° horizontal field of view ensures a subject's peripheral vision is thus fully engaged in a look-ahead mode.

In one embodiment using an external projection system, the surfaces of projection screen 20 are prepared in the manner of rear projection screens such that a light image projected on an exterior surface of projection screen 20 is visible on an interior surface of projection screen 20. Projection screen 20 is attached to shroud 22 at two points on opposite sides of shroud 22 to allow projection screen 20 to be rotated over shroud 22 into a position 23 to facilitate subject ingress to and egress from relaxation chair 12. Shroud 22 is preferably made of an opaque lightweight material, preferably a plastic material. Shroud 22 includes a headrest 24, and two audio speakers 26a (right) and 26b (left). Headrest 24 is shaped to contour the back of a subject's neck and head, and to support the head at a comfortable angle. Audio speakers 26a and 26b are coupled to the external computer system. Audio speakers do not apply external forces to the subject's head or ears. Neutral immersion display hood 16 produces images and sounds while the eyes of a subject positioned on relaxation chair 12 remain in a relaxed look-ahead mode. By requiring only small eye movements, neutral immersion display hood 16 maintains a subject's eyes and their associated muscles in a minimal stress state, further promoting subject relaxation and cyberspace immersion.

Projection screen 20 is made of clear, lightweight material, preferably a plastic material such as Plexiglas. The thickness of projection screen 20 is preferably about 0.125 inches. After being formed, projection screen 20 is preferably subjected to an annealing process to reduce cracking. The exterior surface of projection screen 20 is preferably treated to form a diffusion layer which scatters incident light. The diffusion layer is preferably coated with a scratch-resistant coating. The interior surface of projection screen 20 is preferably coated with an anti-reflective coating.

Figure 3B:
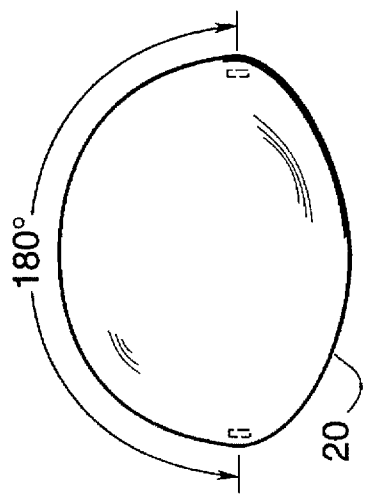
Figure 3C:
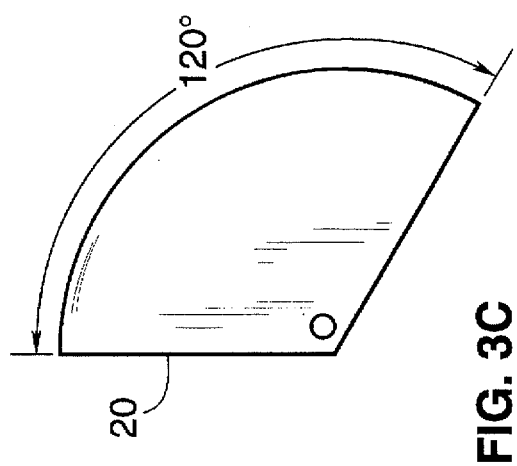
Figure 3A:
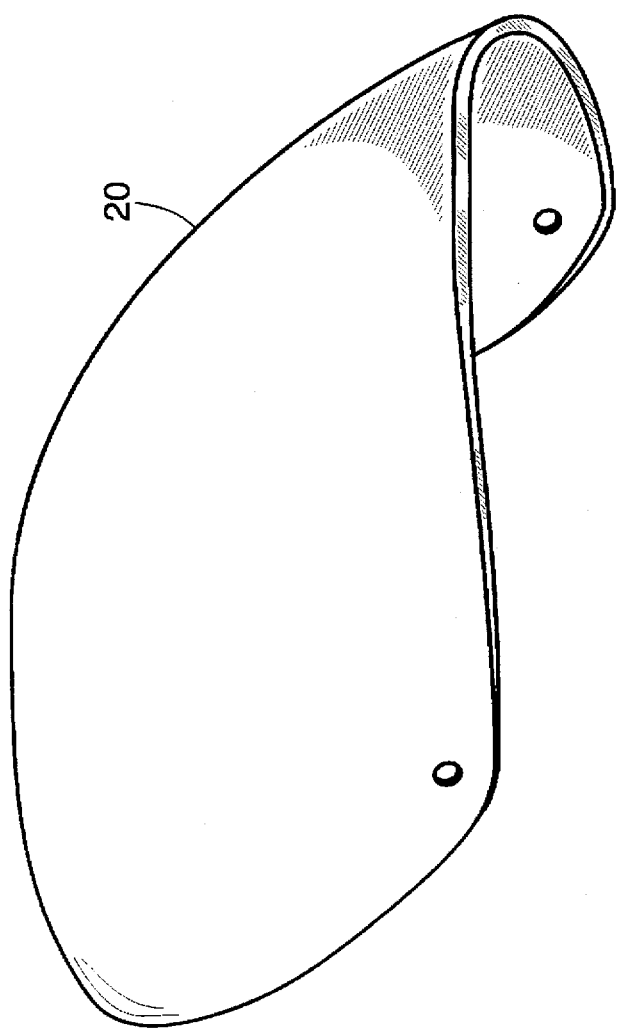
FIG. 3a is a perspective view of a first embodiment of a movable projection screen of the neutral immersion display hood.

Different curvatures of the exterior surface of projection screen 20 may be advantageous in order to properly engage a user's peripheral vision. FIG. 3a is a perspective view of a first embodiment of projection screen 20. In FIG. 3a, projection screen 20 is a section of a hollow sphere. In this embodiment, projection screen 20 has a radius of from 9 to 24 inches, with a preferred radius of about 12 inches. Projection screen 20 preferably covers an angle of 180 degrees when viewed from the front (FIG. 3b) and an angle of 120 degrees when viewed from the side (FIG. 3c).

Figure 4B:
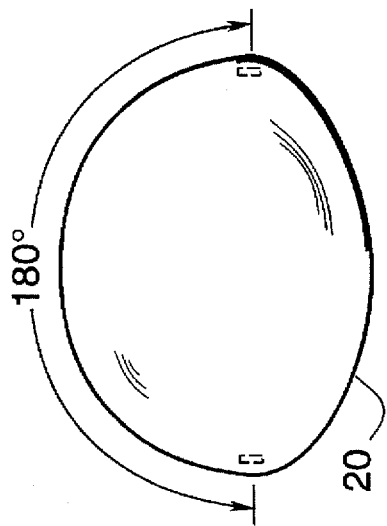
Figure 4C:
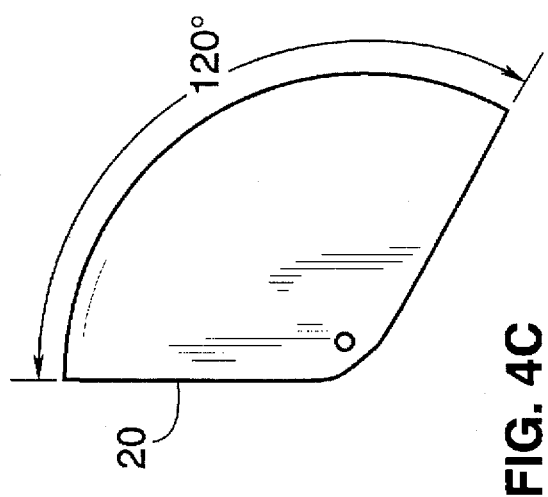
Figure 4A:
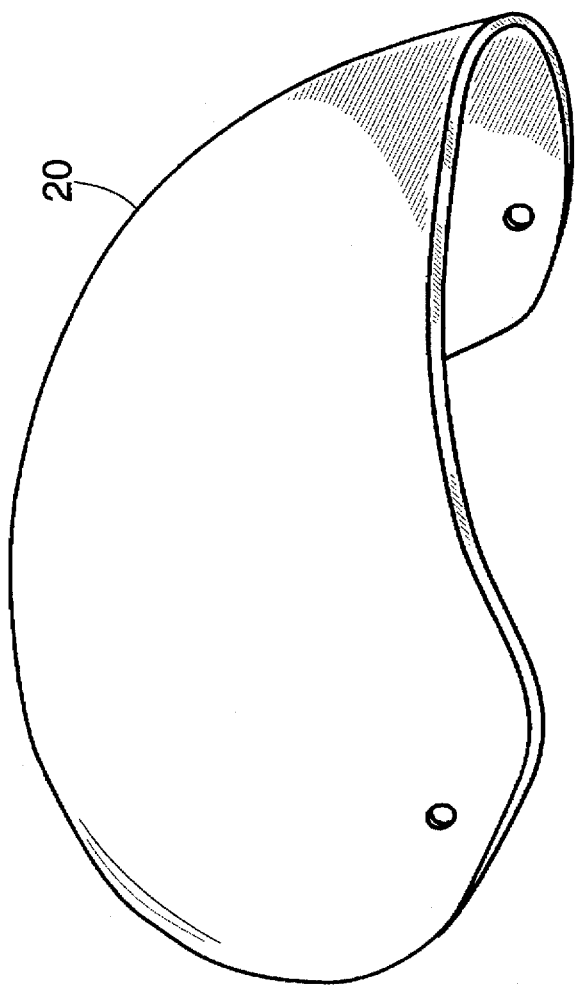
FIG. 4a is a perspective view of a second embodiment of a movable projection screen of the neutral immersion display hood.

FIGS. 4a–c are perspective, front elevation, and side elevation views, respectively, of a second embodiment of projection screen 20 having an exterior surface with a slightly different curvature. In this embodiment, projection screen has a radius of from 9 to 25 inches, with a preferred radius of about 12 inches. Projection screen 20 preferably covers an angle of 180 degrees when viewed from the front (FIG. 4b) and an angle of 120 degrees when viewed from the side (FIG. 4c).

Figure 5B:
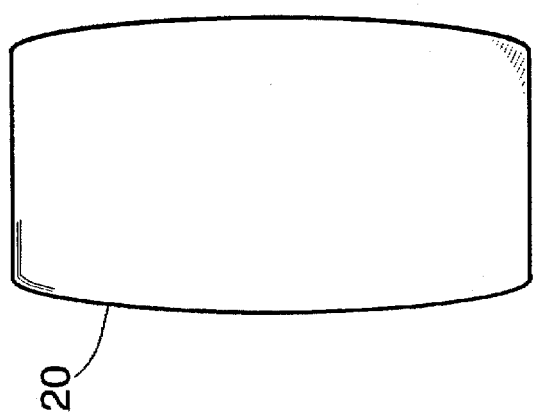
Figure 5C:
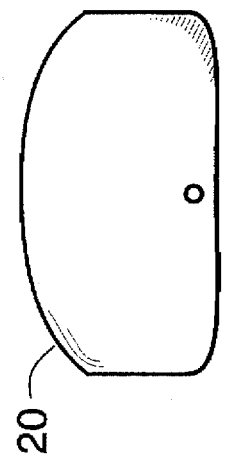
Figure 5A:
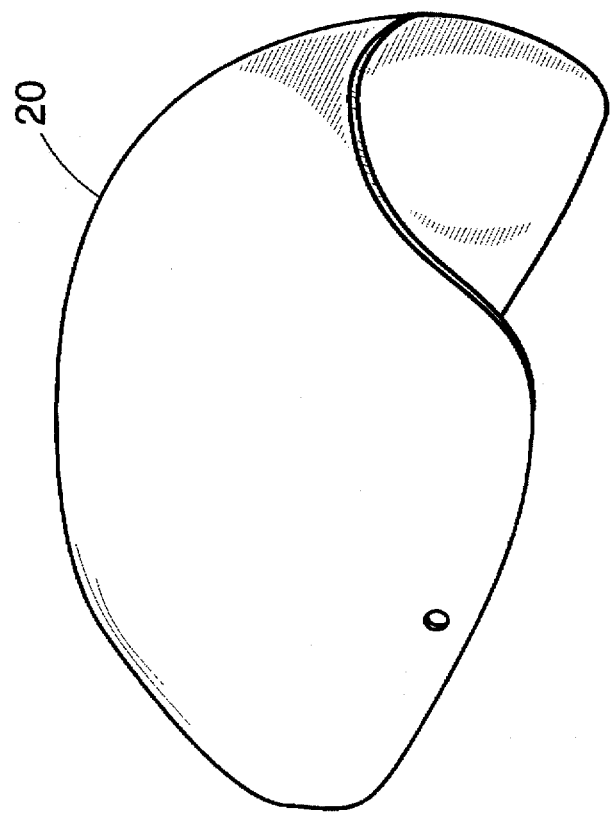
FIG. 5a is a perspective view of a third embodiment of a movable projection screen of the neutral immersion display hood.

FIGS. 5a–c are perspective, front elevation, and side elevation views, respectively, of a third embodiment of projection screen 20 having an exterior surface with a substantially different curvature. In this embodiment, projection screen 20 has a radius of from 9 to 25 inches, with a preferred radius of about 12 inches.

External Projection Subsystem

FIGS. 6a–d illustrate various embodiments of an external image projection subsystem of immersive cyberspace system 10. A first embodiment, shown in FIG. 6a, includes a projector 30 positioned on a pedestal 32 located in front of a subject 28 positioned on relaxation chair 12. During use, a light image is produced by projector 30 and projected directly onto the exterior surface of projection screen 20. Subject 30 is able to see the light image produced by projector 30 on the diffusion layer of the exterior surface of projection screen 20. Projector 30 is coupled to the computer system running the software program which is creating the cyberspace environment.

Figure 6A:
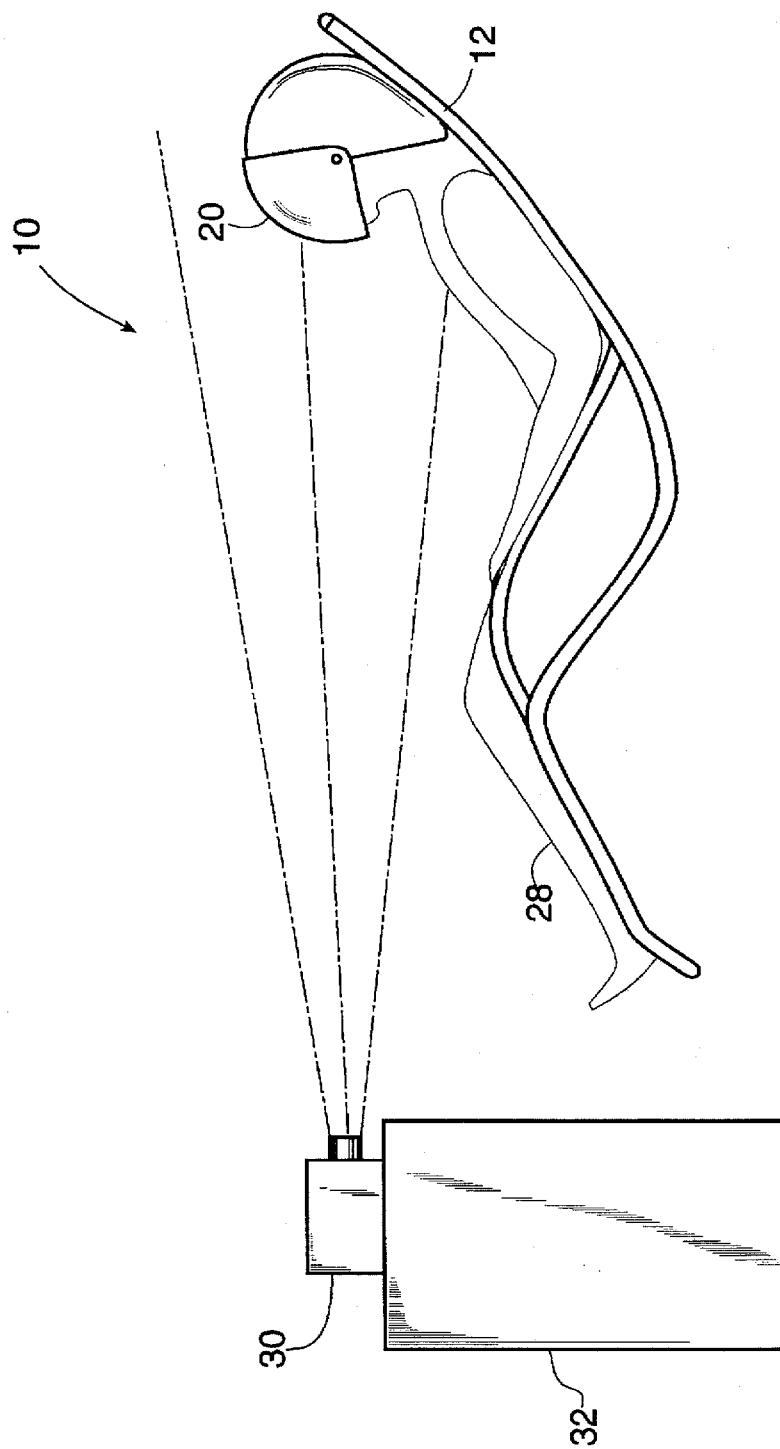
FIG. 6a is a side elevation view of a first embodiment of an external image projection subsystem of the immersive cyberspace system.
Figure 6B:
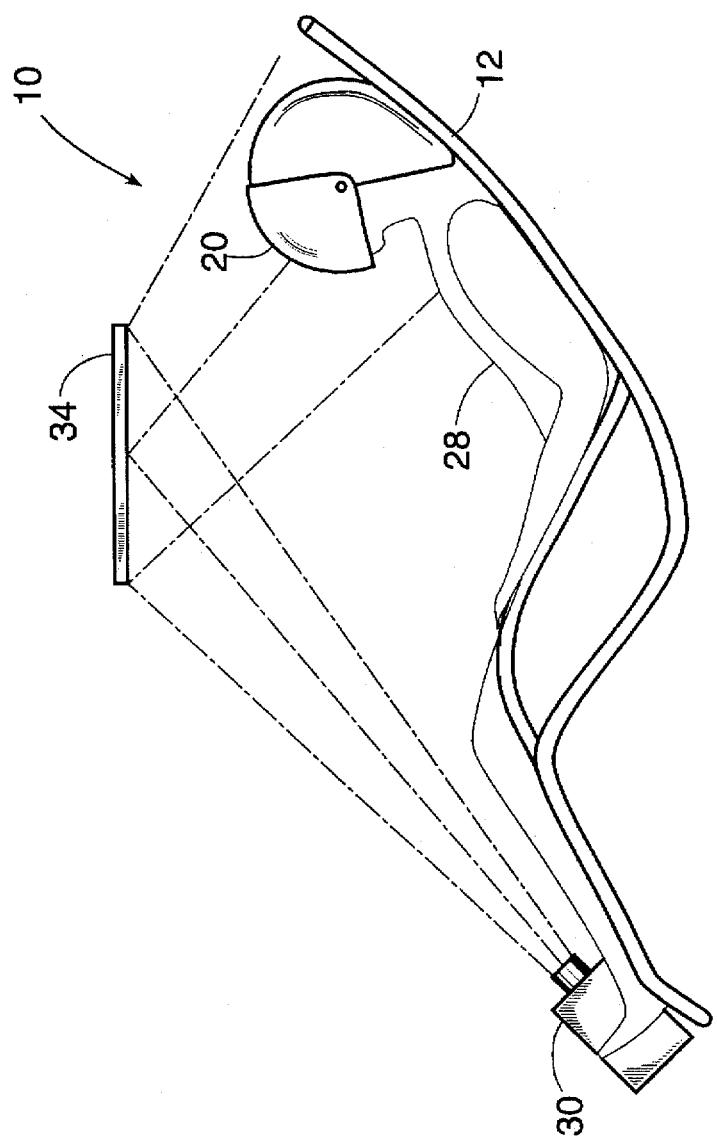
FIG. 6b is a side elevation view of a second embodiment of an external image projection subsystem.
Figure 6C:
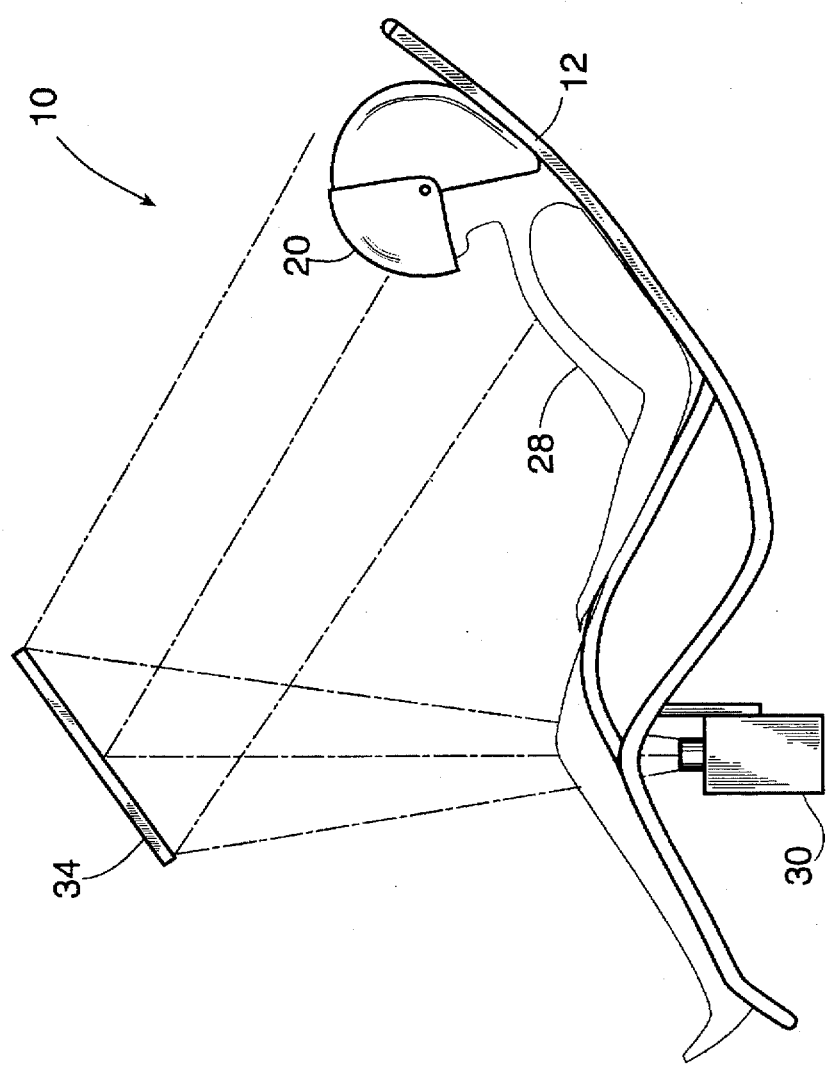
FIG. 6c is a side elevation view of a third embodiment of an external image projection subsystem.
Figure 6D:
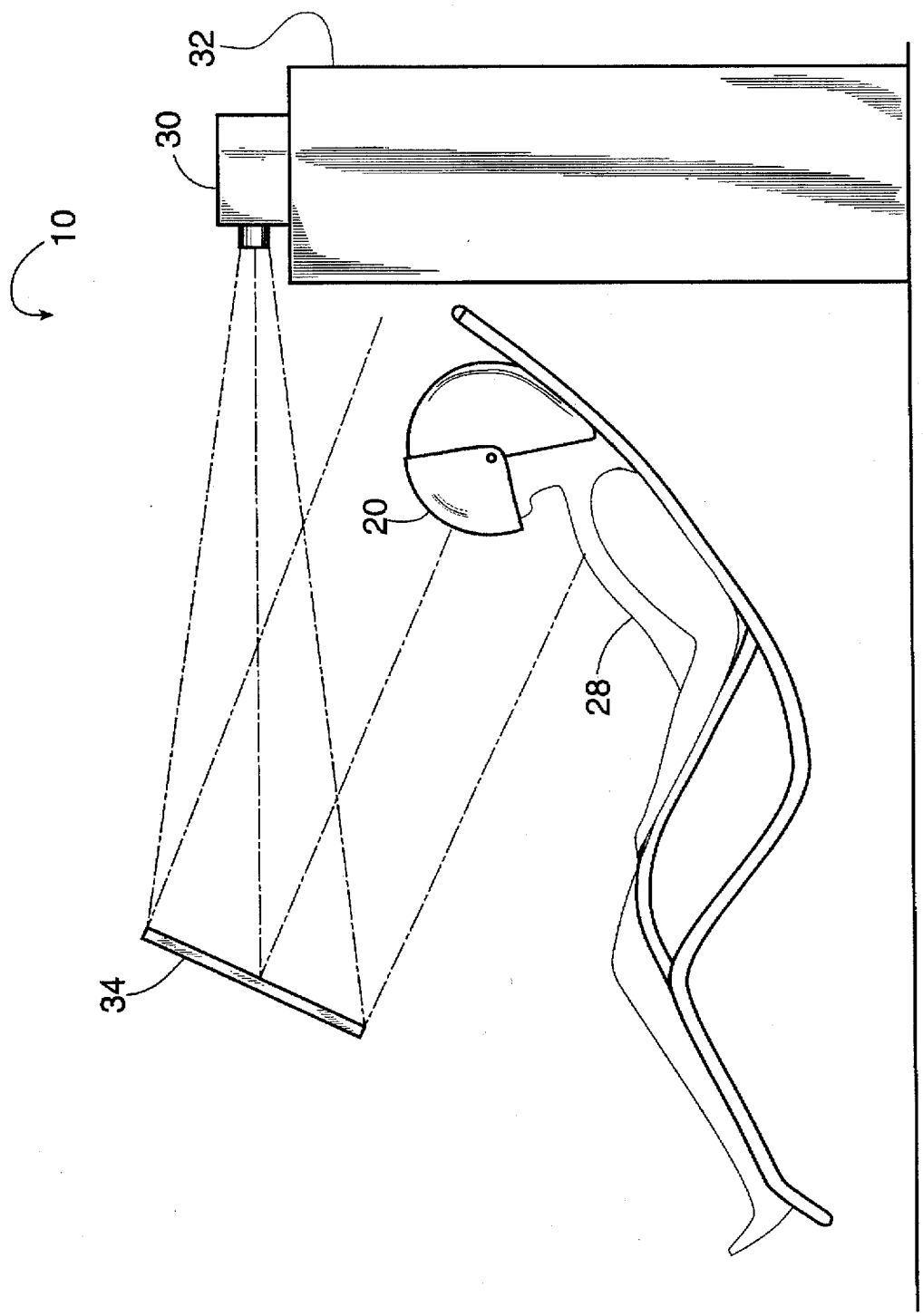
FIG. 6d is a side elevation view of a fourth embodiment of an external image projection subsystem.

In FIGS. 6b–d, the image projection subsystem also includes an adjustable mirror 34. Adjustable mirror 34 allows alternate positioning of projector 30, and may be attached to relaxation chair 12 or supported by a separate stand (not shown). FIG. 6b is a side elevation view of a second embodiment of an image projection subsystem. Projector 30 is attached to relaxation chair 12 and positioned between the ankles of subject 30. A light image produced by projector 30 is reflected off of adjustable mirror 34 and projected onto the exterior surface of projection screen 20. FIG. 6c is a side elevation view of a third embodiment of an image projection subsystem of the immersive cyberspace system. In the embodiment of FIG. 6c, projector 30 is attached to an underside of relaxation chair 12. A light image produced by projector 30 is projected through an opening in relaxation chair 12 between the legs of subject 28, reflected off of adjustable mirror 34, and projected onto the exterior surface of projection screen 20. In the embodiment of FIG. 6c, projector 30 is advantageously located out of the way, and the length of the optical path from projector 30 to projection screen 20 is relatively short. The relatively short optical path length results in improved image quality at projection screen 20 due to reduced light scattering. FIG. 6d is a side elevation view of a fourth embodiment of the image projection subsystem. Projector 30 is positioned on pedestal 32 located behind subject 28. A light image produced by projector 30 is reflected off of adjustable mirror 34 and projected onto the exterior surface of projection screen 20.

Interior Image Projection Subsystem

Figure 7A:
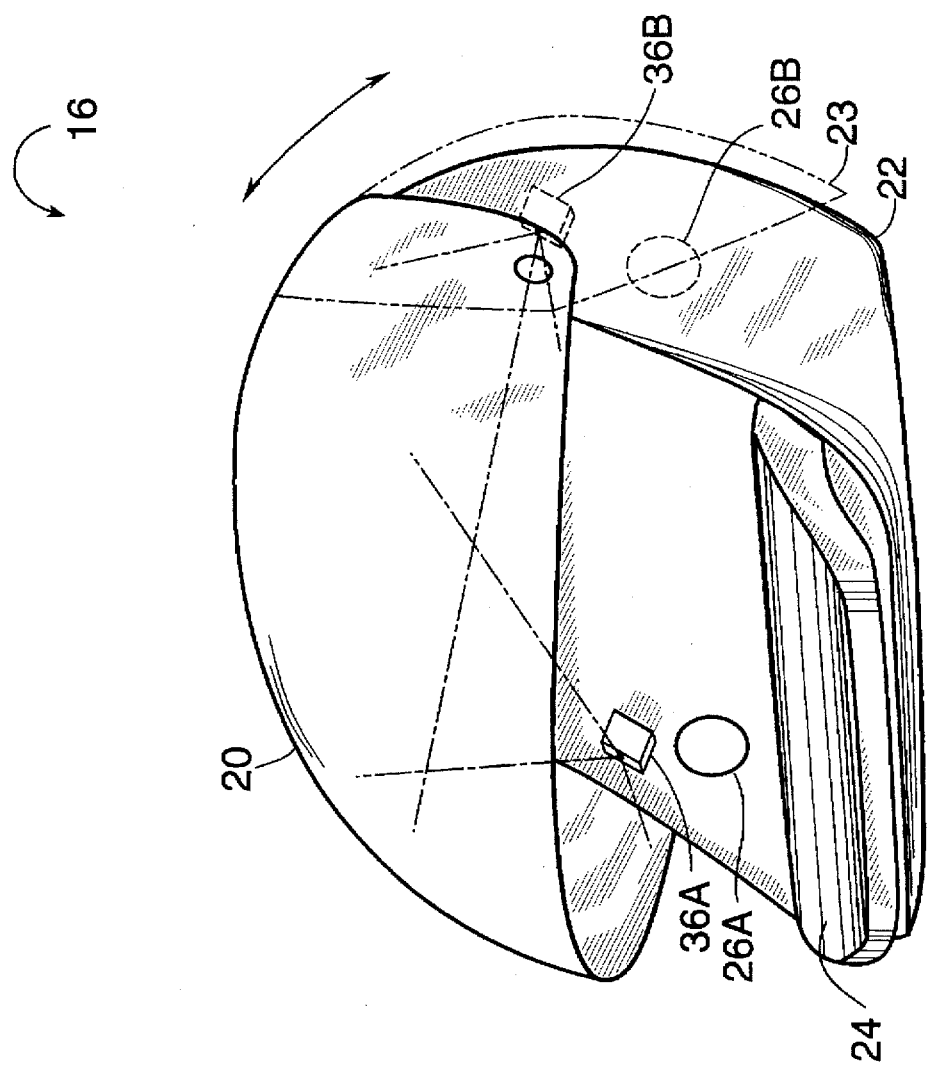
FIG. 7a is a perspective view of the neutral immersion display hood including an interior image projection subsystem.

FIG. 7a is a perspective view of neutral immersion display hood 16 including an interior image projection subsystem. As before, neutral immersion display hood 16 includes a projection screen 20 coupled to an opaque shroud 22, a headrest 24, and two audio speakers 26a (right) and 26b (left). In the embodiment of FIG. 7a, neutral immersion display hood 16 also includes two projectors 36a (right) and 36b (left) located within neutral immersion display hood 16. Projection screen 20 and shroud 22 are preferably made of opaque, lightweight plastic materials. The interior surface of projection screen 20 is preferably coated with a reflective material used to coat front projection screens. Suitable projectors 36a and 36b are small, high-resolution laser projectors. The collimated light produced by laser projectors allows the production of light images which appear in focus over the broad range of focal distances involved. Projectors 36a and 36b are coupled to the computer system running the software program which is creating the cyberspace environment.

Figure 7B:
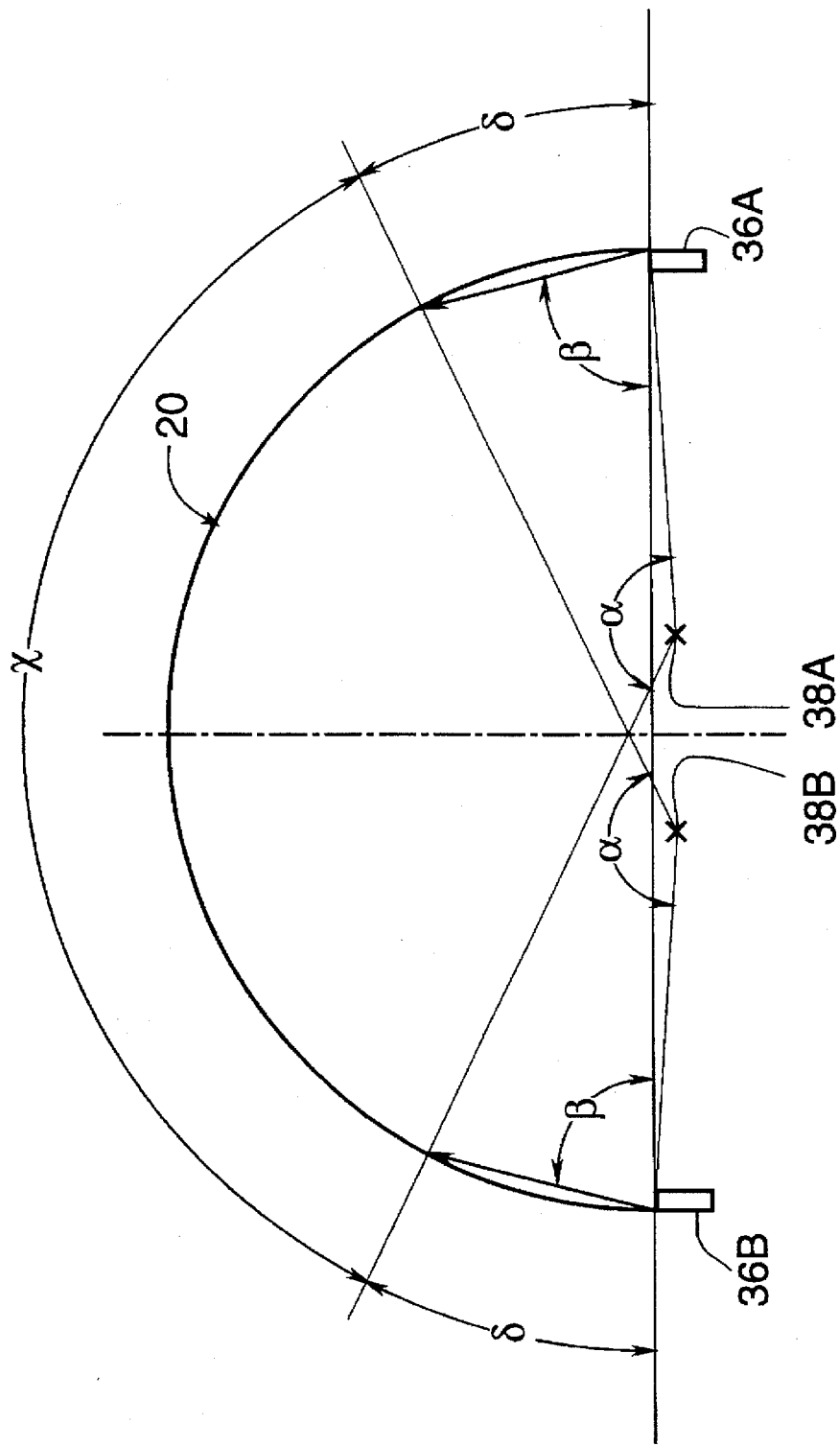
FIG. 7b is a cross-sectional view of the neutral immersion display hood of FIG. 7a illustrating the capabilities of the interior image projection subsystem.

FIG. 7b is a cross-sectional view of the neutral immersion display hood of FIG. 7a illustrating the capabilities of the internal image projection subsystem. Light produced by projectors 36a and 36b reflect off of the inner surface of projection screen 20 and into a subject's eyes 38a (right) and 38b (left). Projectors 36a and 36b are positioned such that the light image produced by right projector 36a is viewed by the subject's left eye 38b, and the light image produced by left projector 36b is viewed by the subject's right eye 38a. Each eye 38a and 38b has a field of view $\alpha$ of approximately 150 degrees horizontally. Each projector 36a and 36b has a projection cone defined by an angle $\beta$ of about 75 degrees. The images produced by projectors 36a and 36b overlap in a region directly in front of the subject's face in a region defined by an angle $\chi$ of approximately 120 degrees. Thus stereo imagery is visible in the overlap region directly in front of the subject's face, while mono (i.e., single source) imagery is visible in peripheral zones defined by angles $\delta$ of approximately 30 degrees. This capability matches the natural stereoscopic capability of human sight. Well known polarization techniques or shutter glasses synchronized with projector images may be used to create three-dimensional effects in the overlap region, and two-dimensional images are visible in the peripheral zones.

Neutral Hand Posture Controller

FIG. 8a is a perspective view of neutral hand posture controller 18a. Neutral hand posture controller 18a retains a subject's hand in a neutral position defined by an axial rotation of the hand about the subject's attached arm of about 30 degrees. In the neutral hand position, internal and external forces acting on the hand are minimized, and a biomechanical equilibrium is reached. Neutral hand posture controller 18a may be adjusted for optimal position, and includes a wrist support 40 and a separate palm piece 42. Wrist support 40 is preferably made of a resilient foam material covered by a protective layer of leather, cloth, or plastic. Wrist support 40 reduces the mass acting on palm piece 40 and reduces wrist strain. Wrist support 40 is preferably coupled to relaxation chair with a plastic hook-and-loop fastener, such as Velcro, which facilitates optimal positioning. Palm piece 42 is molded to the shape of a human hand in the neutral hand position. Palm piece 42 is preferably made of molded plastic and covered with a layer of leather or cloth. Palm piece 42 includes a pressure-sensitive, electrical thumb switch 44a and four pressure-sensitive, electrical finger switches 44b–e which may be used for on/off signal generation or variable signal level control in response to applied pressure. Thumb switch 44a and four pressure-sensitive finger switches 44b–e may be coupled to the computer system to provide interactive control of the cyberspace environment, or may be employed as input devices for data entry in cyberspace.

FIG. 8b is a front elevation view of neutral hand posture controller 18a. Palm piece 42 is coupled to a base 46 through a coupling mechanism providing six degrees of freedom. The coupling mechanism allows the hand, supported by palm piece 42, to move about 0.25 to 3 inch in all directions relative to base 46, thus providing six degrees of freedom (i.e. side-to-side movement, forward and back movement, and up and down movement). The coupling mechanism may also include an electrical switch activated by downward pressure applied by the hand to palm piece 42. Alternately, the coupling mechanism may include a signal generator producing a variable output voltage with a value dependent upon the amount of downward pressure applied by the hand to palm piece 42. The signal produced by the coupling mechanism may be coupled to the computer system for interactive control of the cyberspace environment. Thus a subject may control the upward and downward positioning of a projected image by varying the amount of downward pressure applied to palm piece 42. Resilient members are employed within the coupling mechanism in order to return palm piece 42 to a neutral position relative to base 46. In the embodiment shown, base 46 is coupled to relaxation chair 12 through a mounting bracket 48. The signal generated by the coupling mechanism may also be used for data entry in cyberspace.

Motion Base

Figure 1D:
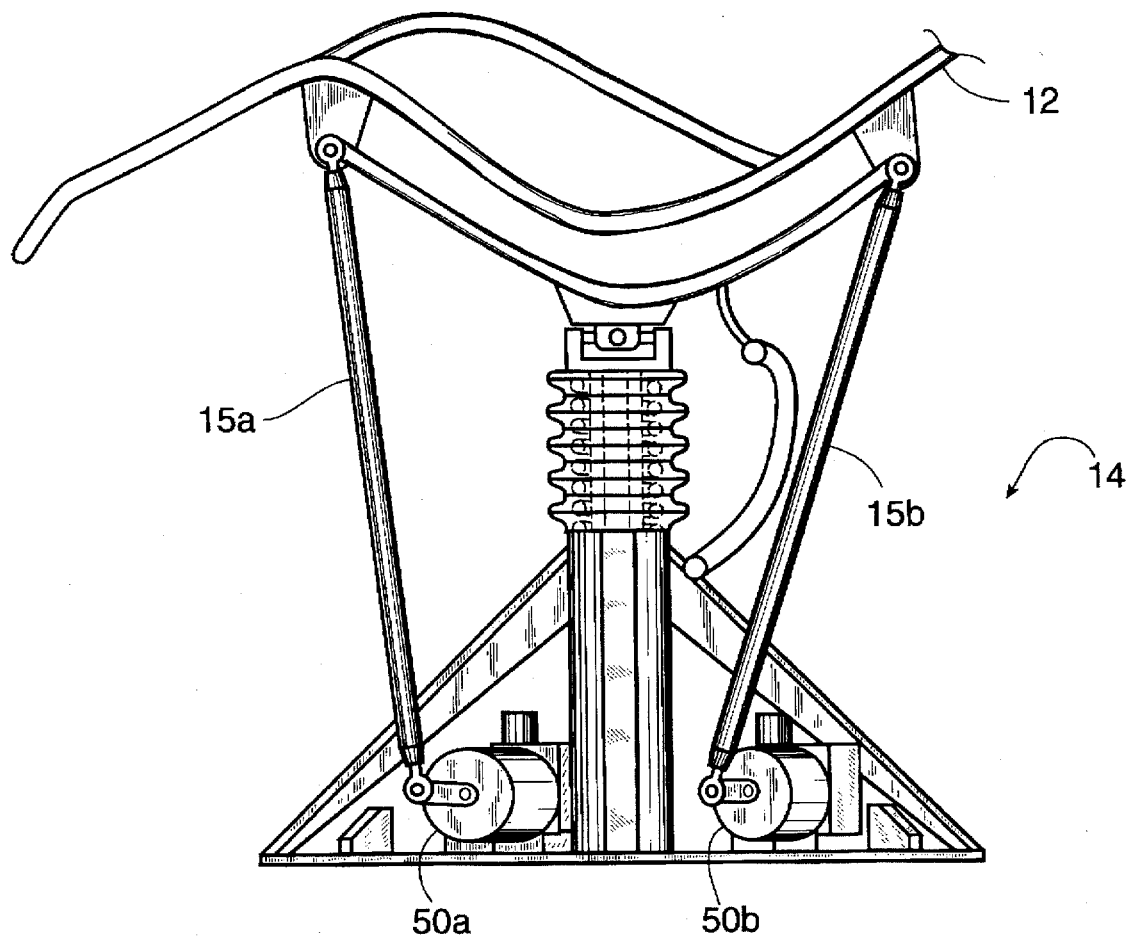
FIG. 1d is a side elevation view of one embodiment of the motion base of the immersive cyberspace system.

Embodiments of motion base 14 are shown in FIGS. 1a–1d. Motion base 14 is similar to the motion base described in pending patent application Ser. No. 08/238,166, titled "Immersive Cyberspace System" and filed May 4, 1994, of which this application is a continuation-in-part. Motion base 14 is preferably an active suspension system mechanically coupled to one or more points on an underside surface of relaxation chair 12 via one or more stanchions 15. Motion base 14 preferably includes a data port coupled to an external computer system executing a software program and creating the cyberspace environment. Motion base 14 also preferably includes an electrical power port coupled to an external source of electrical power, and may include a compressed air port coupled to an external source of compressed air. Motion base 14 supports relaxation chair 12, elevates relaxation chair 12 above a floor level, and also produces vibrational movements of relaxation chair 12 over a range of 0–30 Hz via axial movements of stanchions 15 in response to signals received from the external computer system. Motion base 14 also produces limited translational and rotational movements of relaxation base 12. These limited translational and rotational movements, when properly coordinated with visual stimuli, constitute motion cues which create sensations of pitch, yaw, and roll movements. In the embodiment of FIG. 1d, stanchions 15a and 15b are coupled to output shafts of electrical servomotors 50a and 50b, respectively, and move substantially axially in response to rotations of the output shapes of servomotors 50a and 50b. In other embodiments, each stanchion may be coupled to output shafts of actuators which are pneumatically or hydraulically powered and electro-mechanically controlled. Axial movements of one or more stanchions may be applied to relaxation chair 12 to produce vibrational inputs. In addition, limited translational and rotational movements of relaxation chair 12 may be accomplished by applying substantially axial movements of one or more stanchions to relaxation chair 12.

Vibration Transducers

One or more vibration transducers 19, shown in FIG. 1a, are attached to relaxation chair 12 and provide vibrational inputs from about 20 Hz to about 150 Hz to a subject positioned upon relaxation chair 12 in response to signals received from the external computer. Properly coordinated input signals may produce sensations of waves traveling up and down the subject's body.

Conclusion

Therefore, the present invention comprises an immersive cyberspace system which provides visual, audible, motion cueing, and vibrational input to a subject remaining in a neutral body position, and also provides for subject control input. The immersive cyberspace system includes a relaxation chair and a neutral immersion display hood. The relaxation chair supports a subject positioned thereupon, and places the subject in position which merges a neutral body position, the position a body naturally assumes in zero gravity, with the savasana yoga position, the position used by yogi for thousands of years to reach an enhanced meditative relaxation state. The display hood, which covers the subject's head, is configured to produce light images and sounds. An image projection subsystem provides either external or internal image projection. The display hood includes a projection screen moveably attached to an opaque shroud. A motion base supports the relaxation chair and produces vibrational inputs over a range of about 0–30 Hz. The motion base also produces limited translational and rotational movements of the relaxation chair. These limited translational and rotational movements, when properly coordinated with visual stimuli, constitute motion cues which create sensations of pitch, yaw, and roll movements. Vibration transducers produce vibrational inputs from about 20 Hz to about 150 Hz. An external computer, coupled to various components of the immersive cyberspace system, executes a software program and creates the cyberspace environment. One or more neutral hand posture controllers may be coupled to the external computer system and used to control various aspects of the cyberspace environment, or to enter data during the cyberspace experience.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An immersive cyberspace system, comprising:

a relaxation chair adapted to receive a subject, wherein the relaxation chair is configured to place the subject in a relaxed neutral body position;

a motion base attached to an underside of the relaxation chair and configured to support and elevate the relaxation chair above a floor level, wherein the motion base is configured to move the relaxation chair;

a neutral immersion display hood configured to substantially cover a head of the subject positioned on the relaxation chair, wherein the neutral immersion display hood is adapted to produce light images and sounds, and wherein the neutral immersion display hood comprises:

an opaque shroud configured to cover at least a portion of the head of the subject positioned on the relaxation chair;

a projection screen moveably attached to the shroud and configured to substantially cover a front portion of the head of the subject during use;

a headrest located within the shroud and configured to support the head of the subject; and at least one audio speaker located within the shroud and configured to produce sounds over an audible frequency range; and at least one neutral hand posture controller configured to maintain the hand of the subject in a neutral posture, and comprising at least one pressure-sensitive electrical switch configured for activation by movement of the hand.

2. The immersive cyberspace system as recited in claim 1, wherein the light image produced by the neutral immersion display hood engages the peripheral vision of the subject.

3. The immersive cyberspace system as recited in claim 1, wherein said opaque shroud is configured to substantially cover a top portion, side portions, and a back portion of the head of the subject.

4. The immersive cyberspace system as recited in claim 1, wherein the projection screen includes an exterior surface and an interior surface, wherein the exterior and interior surface are configured such that a light image projected upon the exterior surface of the projection screen is visible on the interior surface of the projection screen.

5. The immersive cyberspace system as recited in claim 4, further comprising a projector positioned to project a light image directly upon the exterior surface of the projection screen of the neutral immersion display hood.

6. The immersive cyberspace system as recited in claim 4, further comprising:
   a projector configured to produce a light image; and
   an adjustable mirror;
wherein the projector is positioned to project said light image toward the adjustable mirror, and wherein the adjustable mirror is configured to reflect said light image onto the exterior surface of the projection screen of the neutral immersion display hood.

7. The immersive cyberspace system as recited in claim 6, wherein the projector is attached to an underside of the relaxation chair and positioned to project said light image through an opening in the relaxation chair, and wherein the adjustable mirror is configured to reflect said light image onto the exterior surface of the projection screen of the neutral immersion display hood.

8. The immersive cyberspace system as recited in claim 6, wherein the projector is located behind the relaxation chair and positioned to project said light image toward the adjustable mirror, and wherein the adjustable mirror is configured to reflect said light image onto the exterior surface of the projection screen of the neutral immersion display hood.

9. The immersive cyberspace system as recited in claim 6, wherein the projection screen includes an exterior surface and an interior surface, and wherein the interior surface of the projection screen is configured such that a light image cast upon the interior surface is visible on the interior surface of the projection screen.

10. The immersive cyberspace system as recited in claim 9, wherein the neutral immersion display hood further comprises at least one projector located within the shroud and configured to produce a light image and to project the light image upon the interior surface of the projection screen.

11. The immersive cyberspace system as recited in claim 10, wherein said at least one projector is a laser projector.

12. The immersive cyberspace system as recited in claim 9, wherein the neutral immersion display hood comprises two projectors located on opposite sides of an interior portion of the shroud, wherein the two projectors are each configured to produce a light image, and wherein the two light images produced by the projectors overlap in a central region of the interior surface of the projection screen.

13. The immersive cyberspace system as recited in claim 12 wherein the two projectors are laser projectors.

14. The immersive cyberspace system as recited in claim 13, wherein the light images are produced in such a manner that a subject viewing the interior surface of the projection screen perceives a three-dimensional image in the central region of the interior surface of the projection screen where the two light images overlap.

15. The immersive cyberspace system as recited in claim 4, further comprising:
   a projector configured to produce a light image; and
   an adjustable mirror;
wherein the projector is attached to the relaxation chair and positioned to project said light image toward the adjustable mirror, and wherein the adjustable mirror is configured to reflect said light image onto the exterior surface of the projection screen of the neutral immersion display hood.

16. The immersive cyberspace system as recited in claim 1, wherein the at least one pressure-sensitive electrical switch comprises a thumb switch and four finger switches.

17. The immersive cyberspace system as recited in claim 1, wherein the neutral hand posture controller further comprises:
   a wrist support configured to support a wrist of the subject positioned on the relaxation chair;
   a palm piece configured to support a hand of the subject; and
   a base coupled to the palm piece, wherein the base and palm piece are oriented such that the hand of the subject is retained in a neutral position defined by an axial rotation of the hand about an attached arm of the subject of about 30 degrees.

18. The immersive cyberspace system as recited in claim 17, wherein the coupling between the base and the palm piece allows the hand supported by the palm piece to move about 0.25 inch in all directions relative to the base, thus providing six degrees of freedom.

19. The immersive cyberspace system as recited in claim 18, wherein the neutral hand posture controller further comprises an electrical switch activated by downward pressure applied by the hand to the palm piece.

20. The immersive cyberspace system as recited in claim 18, wherein the neutral hand posture controller further comprises a signal generator which produces a variable output voltage having a value dependent upon the downward pressure applied by the hand to the palm piece.

21. The immersive cyberspace system as recited in claim 1, further comprising at least one vibration transducer attached to the relaxation chair and configured to produce vibrational inputs to the relaxation chair.

22. The immersive cyberspace system as recited in claim 1, wherein the vibrational inputs produced by the motion base span a range from about 0 Hz to about 30 Hz.

23. The immersive cyberspace system as recited in claim 22, wherein the motion base comprises a plurality of actuators configured to produce limited translational and rotational movements of the relaxation chair.

24. The immersive cyberspace system as recited in claim 23, wherein the translational and rotational movements of the relaxation chair are coordinated with the light images produced by the neutral immersion display hood in order to provide motion cues, wherein the motion cues give the subject a sensation of pitch, yaw, and roll movements.

25. The immersive cyberspace system as recited in claim 11, wherein the motion base comprises at least one stanchion.

26. The immersive cyberspace system as recited in claim 25, wherein the at least one stanchion is coupled to an output shaft of an electrical servomotor.

27. The immersive cyberspace system as recited in claim 25, wherein the at least one stanchion is coupled to an output shaft of an actuator which is electrically powered and controlled.

28. A neutral immersion display hood, comprising:
an opaque shroud configured to substantially cover a top portion, side portions, and a back portion of a user's head;
a projection screen moveably attached to the shroud and configured to substantially cover a front portion of the user's head during use;
a headrest located within the shroud and configured to support the user's head; and
at least one audio speaker located within the shroud and configured to produce sounds over an audible frequency range.

29. The immersion display hood as recited in claim 28, wherein the projection screen includes an exterior surface and an interior surface, wherein the exterior and interior surface are configured such that a light image projected upon the exterior surface of the projection screen is visible on the interior surface of the projection screen.

30. The immersion display hood as recited in claim 29, further comprising a projector positioned to project a light image directly upon the exterior surface of the projection screen of the neutral immersion display hood.

31. The immersion display hood as recited in claim 28, wherein the projection screen includes an exterior surface and an interior surface, and wherein the interior surface of the projection screen is configured such that a light image cast upon the interior surface is visible on the interior surface of the projection screen.

32. The immersion display hood as recited in claim 31, further comprising at least one projector located within the shroud and configured to produce a light image and to project the light image upon the interior surface of the projection screen.

33. A neutral hand posture controller, comprising:
a wrist support configured to support a user's wrist;
a base;
a palm piece configured to support a user's hand and moveably attached to the base, wherein the palm piece and the base are oriented such that a user's hand is retained in a neutral position defined by an axial rotation of the user's hand about an attached user's arm of about 30 degrees; and
at least one pressure-sensitive electrical switch configured for activation by movement of the user's hand.

34. The neutral hand posture controller as recited in claim 33, wherein the coupling between the base and the palm piece allows the hand supported by the palm piece to move about 0.25 inch in all directions relative to the base, thus providing six degrees of freedom.

35. The neutral hand posture controller as recited in claim 33, further comprising an electrical switch activated by downward pressure applied by the hand to the palm piece.

36. The neutral hand posture controller as recited in claim 35, further comprising a signal generator which produces a variable output voltage having a value dependent upon the downward pressure applied by the hand to the palm piece.

37. The neutral hand posture controller as recited in claim 33, wherein the at least one pressure-sensitive electrical switch comprises a thumb switch and four finger switches.

38. An immersive cyberspace system, comprising:
a relaxation chair adapted to receive a subject, wherein the relaxation chair is configured to place the subject in a relaxed neutral body position;
a motion base attached to an underside of the relaxation chair and configured to support and elevate the relaxation chair above a floor level, wherein the motion base is configured to move the relaxation chair;
a neutral immersion display hood configured to substantially cover a head of the subject positioned on the relaxation chair, wherein the neutral immersion display hood is adapted to produce light images and sounds; and
at least one neutral hand posture controller configured to maintain the hand of the subject in a neutral posture, each hand posture controller comprising:
at least one pressure-sensitive electrical switch configured for activation by movement of the hand;
a wrist support configured to support a wrist of the subject positioned on the relaxation chair;
a palm piece configured to support a hand of the subject; and
a base coupled to the palm piece, wherein the base and palm piece are oriented such that the hand of the subject is retained in a neutral position defined by an axial rotation of the hand about an attached arm of the subject of about 30 degrees.

39. The immersive cyberspace system as recited in claim 38, wherein the coupling between the base and the palm piece allows the hand supported by the palm piece to move about 0.25 inch in all directions relative to the base, thus providing six degrees of freedom.

40. The immersive cyberspace system as recited in claim 39, wherein the neutral hand posture controller further comprises an electrical switch activated by downward pressure applied by the hand to the palm piece.

41. The immersive cyberspace system as recited in claim 39, wherein the neutral hand posture controller further comprises a signal generator which produces a variable output voltage having a value dependent upon the downward pressure applied by the hand to the palm piece.

42. An immersive cyberspace system, comprising:
a relaxation chair adapted to receive a subject, wherein the relaxation chair is configured to place the subject in a relaxed neutral body position; and
a neutral immersion display hood configured to substantially cover a head of the subject positioned on the relaxation chair, wherein the neutral immersion display hood is adapted to produce light images and sounds, wherein the neutral immersion display hood comprises:
an opaque shroud configured to cover at least a portion of the head of the subject positioned on the relaxation chair;
a projection screen attached to the shroud and configured to substantially cover a front portion of the subject's head during use;
a headrest located within the shroud and configured to support the subject's head; and
at least one audio speaker located within the shroud and configured to produce sounds over an audible frequency range.

43. The immersive cyberspace system as recited in claim 42, further comprising a motion base attached to an underside of the relaxation chair and configured to support and elevate the relaxation chair above a floor level, and wherein the motion base is configured to move the relaxation chair.

44. The immersive cyberspace system as recited in claim 42, further comprising at least one neutral hand posture controller configured to maintain the hand of a subject in a neutral posture, and comprising at least one pressure-sensitive electrical switch configured for activation by movement of the hand.

45. The immersive cyberspace system as recited in claim 42, wherein said opaque shroud is configured to substantially cover a top portion, side portions, and a back portion of the subject's head.

46. The immersive cyberspace system as recited in claim 42, wherein said projection screen is moveably attached to the shroud.

47. The immersive cyberspace system as recited in claim 42, wherein the projection screen includes an exterior surface and an interior surface, wherein the exterior and interior surface are configured such that a light image projected upon the exterior surface of the projection screen is visible on the interior surface of the projection screen.

48. The immersive cyberspace system as recited in claim 47, further comprising a projector positioned to project a light image directly upon the exterior surface of the projection screen of the neutral immersion display hood.

49. The immersive cyberspace system as recited in claim 42, wherein the projection screen includes an exterior surface and an interior surface, and wherein the interior surface of the projection screen is configured such that a light image cast upon the interior surface is visible on the interior surface of the projection screen.

50. The immersive cyberspace system as recited in claim 49, wherein the neutral immersion display hood further comprises at least one projector located within the shroud and configured to produce a light image and to project the light image upon the interior surface of the projection screen.

51. The immersive cyberspace system as recited in claim 42, further comprising:

a projector configured to produce a light image; and an adjustable mirror;

wherein the projector is positioned to project said light image toward the adjustable mirror, and wherein the adjustable mirror is configured to reflect said light image onto the exterior surface of the projection screen of the neutral immersion display hood.

52. The immersive cyberspace system as recited in claim 51, wherein the projector is attached to an underside of the relaxation chair and positioned to project said light image through an opening in the relaxation chair, and wherein the adjustable mirror is configured to reflect said light image onto the exterior surface of the projection screen of the neutral immersion display hood.

53. The immersive cyberspace system as recited in claim 51, wherein the projector is located behind the relaxation chair and positioned to project said light image toward the adjustable mirror, and wherein the adjustable mirror is configured to reflect said light image onto the exterior surface of the projection screen of the neutral immersion display hood.

54. The immersive cyberspace system as recited in claim 42, further comprising:

a projector configured to produce a light image; and an adjustable mirror;

wherein the projector is attached to the relaxation chair and positioned to project said light image toward the adjustable mirror, and wherein the adjustable mirror is configured to reflect said light image onto the exterior surface of the projection screen of the neutral immersion display hood.

55. The immersive cyberspace system as recited in claim 42, further comprising a motion base attached to an underside of the relaxation chair and configured to support and elevate the relaxation chair above a floor level, and wherein the motion base is configured to move the relaxation chair.

56. The immersive cyberspace system as recited in claim 55, wherein the motion base comprises a plurality of actuators configured to produce limited translational and rotational movements of the relaxation chair.

57. The immersive cyberspace system as recited in claim 42, further comprising at least one neutral hand posture controller configured to maintain the hand of a subject in a neutral posture, and comprising at least one pressure-sensitive electrical switch configured for activation by movement of the hand.

58. The immersive cyberspace system as recited in claim 42, wherein the light image produced by the neutral immersion display hood engages the peripheral vision of the subject.

59. A neutral immersion display hood, comprising:

an opaque shroud configured to cover at least a portion of a user's head;

a projection screen moveably attached to the shroud and configured to substantially cover a front portion of the user's head during use;

a headrest located within the shroud and configured to support the user's head; and at least one audio speaker located within the shroud and configured to produce sounds over an audible frequency range.

60. The neutral immersion display hood of claim 59, wherein the opaque shroud is configured to substantially cover a top portion, side portions, and a back portion of the user's head.

* * * * *